June 13, 1967 R. O. TUEGEL 3,324,976
FRICTION DEVICE
Filed Oct. 13, 1965 2 Sheets-Sheet 1

INVENTOR
ROBERT O. TUEGEL
BY William R. O'Meara

INVENTOR
ROBERT O. TUEGEL
BY William R. O'Meara

United States Patent Office 3,324,976
Patented June 13, 1967

3,324,976
FRICTION DEVICE
Robert O. Tuegel, St. Louis County, Mo., assignor to Wagner Electric Corporation, St. Louis, Mo., a corporation of Delaware
Filed Oct. 13, 1965, Ser. No. 495,564
15 Claims. (Cl. 188—170)

ABSTRACT OF THE DISCLOSURE

In a spring applied pressure released brake, an adjustment member is threadedly movable on the brake actuating cylinder and engaged with the brake applying spring to adjustably control the compressive force thereof.

Figure 1:
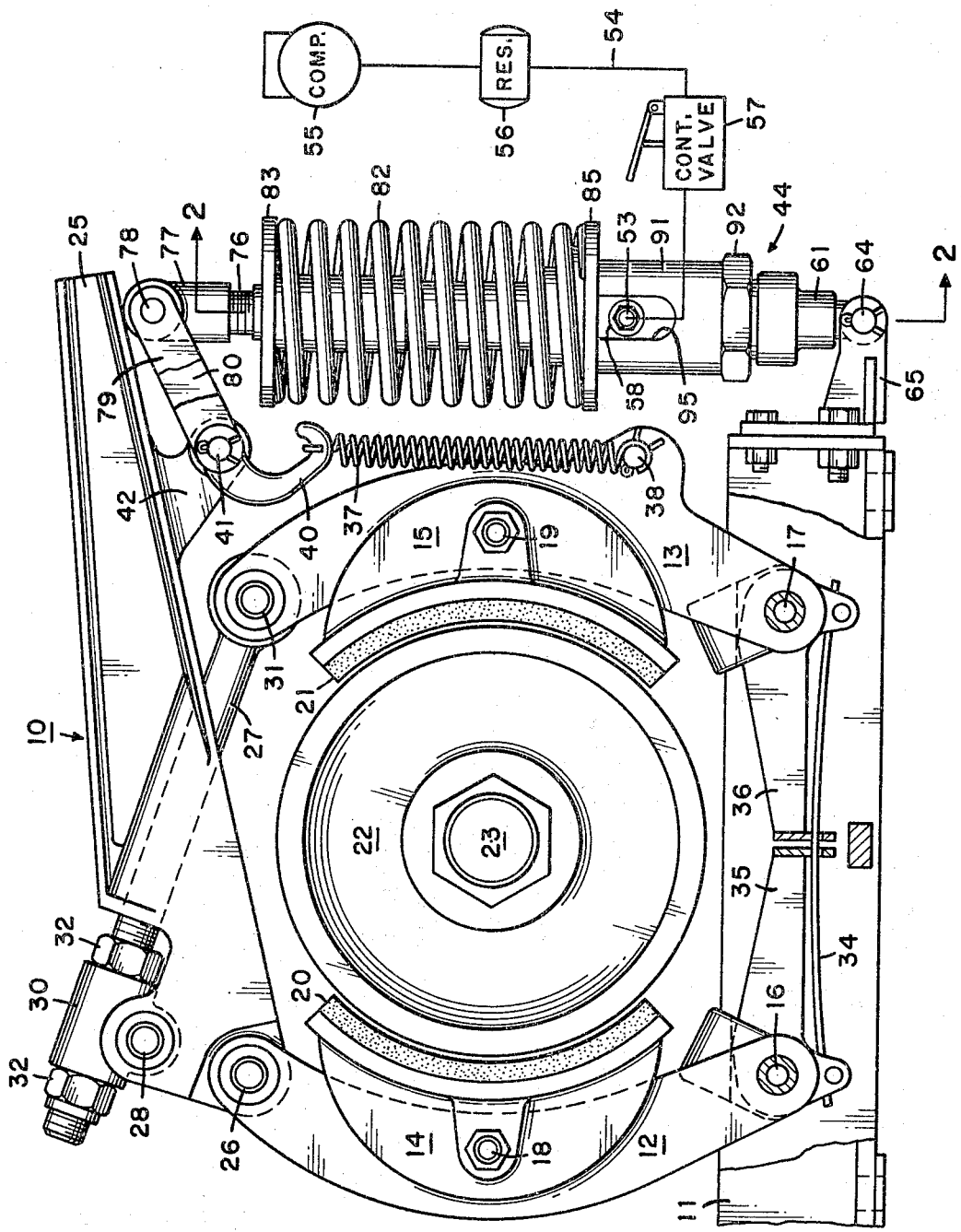

This invention relates to friction devices and more particularly to friction device actuating means.

Friction devices, for example, industrial brakes, are often provided with actuating means which include spring means for applying or energizing the brake and a fluid pressure actuated power cylinder having piston means connected with the spring means and responsive to a predetermined fluid pressure in the power cylinder for overcoming the force of the spring means to release or de-energize the brake. Brakes of the above-mentioned type can be used, for example, in connection with winches or hoists, industrial conveyors, and many other types of industrial applications.

The spring-applied braking torque for any particular application is critical. If the braking torque is too light, the brake will fail to provide suitable braking or fail to stop the associated equipment in the desired amount of time. On the other hand, if the braking torque is too great, it can damage associated equipment. For example, where such a brake is used for stopping a conveyor that is driven by a motor through a gear train, damage to the gear train or other equipment might occur if the conveyor is stopped too quickly as a result of excess braking torque. Thus, the force of the spring means providing the braking torque must be carefully selected to meet the requirements of the particular application.

In many cases there is no suitable way of computing the optimum braking torque for a particular application, and it may be necessary that several brake actuators having different spring forces be tried under actual working conditions in order to select the most suitable one and this, of course, requires time and labor. Also, it is often the case that the load, such as the material carried by an industrial conveyor or the load lifted by a hoist or winch, will vary from time to time with the result that the equipment will be operated under dangerous conditions or require the substitution of a new actuator.

It is, therefore, an object of the present invention to provide novel actuating means for a friction device which overcomes to a large degree the above-mentioned disadvantages.

A more specific object of the present invention is to provide novel friction device actuating means having resilient means for effecting frictional engagement between relatively movable friction members of the device wherein the actuating means is provided with simple and effective means for adjusting the force of the resilient means.

Another object is to provide improved actuating means for a friction device having spring means for effecting frictional engagement between cooperable friction members of the device and power cylinder means adapted to overcome the force of the spring means in response to predetermined fluid pressure in the cylinder means whereby novel spring force adjusting means are provided so that the friction device is capable of use under an extended range of loading conditions.

Still another object is to provide actuating means for a brake having a friction member movable into frictional engagement with a rotatable element wherein the actuating means includes spring means for providing the brake applying force, a fluid pressure actuating cylinder for overcoming the force of said spring means to effect release of the brake, and novel spring force adjustment means for varying the effective brake applying force of the actuating means whereby the brake can be operated under an extended range of loading conditions.

These and other objects and advantages of the present invention will be apparent hereinafter.

Briefly, the present invention embodies operating means for a friction device which includes housing means, resilient means on the housing means adapted to energize the friction device, actuating means in the housing means connected with the resilient means for movement against the force of the resilient means in response to an applied predetermined force thereon, and means connected to said housing means for engagement with said resilient means and adjustably movable relative to said housing means to adjust the force of said resilient means.

Figure 2:
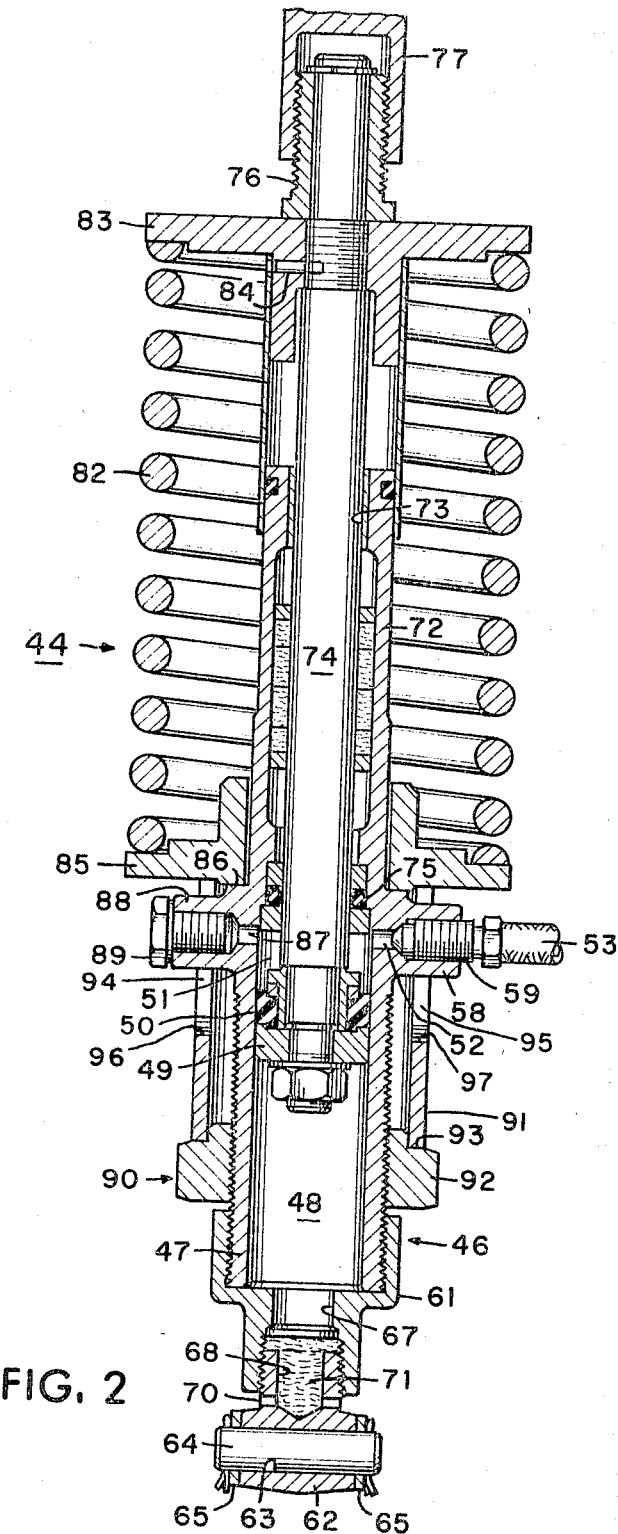
Figure 3:
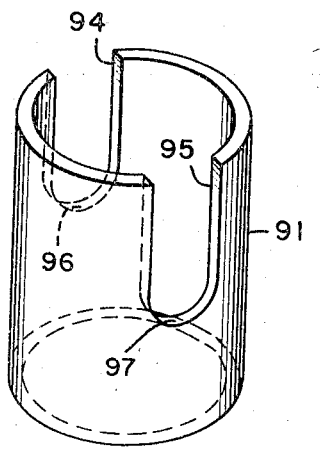

In the drawings which illustrate an embodiment of the present invention,

FIG. 1 is an elevational view of a friction device utilizing actuating means embodying the present invention, FIG. 2 is an enlarged sectional view taken along the line 2—2 of FIG. 1 but showing the actuating means in a friction device energizing condition, and FIG. 3 is a perspective view of a portion of the adjusting means of the actuating means of FIGS. 1 and 2.

Referring now to the drawings and particularly to FIG. 1, there is shown for illustration a friction device in the form of an industrial brake 10 which includes a base or support 11 to which two brake arms or levers 12 and 13 carrying arcuate brake shoes 14 and 15, respectively, are pivotally connected by pins 16 and 17, respectively. The brake shoes 14 and 15 are pivotally connected respectively to the levers 12 and 13 by pins 18 and 19 and are provided with friction linings 20 and 21, respectively, which are adapted for frictional engagement with a rotatable brake drum or wheel 22 fixed to a rotatable shaft 23. The shaft 23 may be part of the drive mechanism of a conveyor, winch, etc. (not shown), the operation of which is to be controlled by brake 10.

A generally L-shaped brake control or actuating lever 25 is pivotally connected at its toe end to the upper end of lever 12 by a pin 26 and at its heel end to one end of a rod or link 27 by a pin 28 extending through a coupling element 30 which receives the link 27. The other end of link 27 is pivotally connected to the upper end of lever 13 by a pin 31. The coupling element 30 is adjustably positioned on link 27 by means of nuts 32 on link 27 at opposite sides of element 30 for adjusting the effective length of link 27 and predeterminately locating the brake shoes 14 and 15 relative to drum 22. The brake 10 is also provided with a suitable shoe-centering mechanism which includes a shoe-centering leaf spring 34 and a pair of shoe-centering arms 35 and 36 pivotally connected on pins 16 and 17. The free ends of arms 35 and 36 are equally positioned and urged by spring 34 toward drum 22 with the arms 35 and 36 engaging and urging the lower ends of levers 12 and 13 apart to maintain the shoes 14 and 15 centered. A shoe return spring 37 is connected at one end to lever 13 by a pin 38 and at the other end to one end of an arm 40 having an opposite end pivotally connected by a pin 41 to a depending portion 42 of lever 25 which is adjacent to but spaced from the right end thereof.

An actuator 44, which provides the actuating means for controlling the operation of brake 10, is connected between the base 11 and right end portion of the lever 25 to selectively effect energization and deenergization of the brake 10.

Referring also to FIG. 2, the actuator 44 includes a housing, indicated generally at 46, having a fluid pressure power cylinder 47 with an axial bore 48 therein, and a piston 49 having a sealing cup 50 reciprocal in the bore 48. The piston 49 and bore 48 define an expansible actuating chamber 51. An inlet or working port 52 communicating with the chamber 51 is connected by a fluid pressure conduit or hose 53 to the outlet or delivery side of a pressure fluid system 54 (FIG. 1) which is shown as including pressure generating means, such as a compressor 55, a reservoir 56, and a control valve 57 for supplying pressure fluid to chamber 51. The port 52 is formed through a radially extending integral portion 58 of the cylinder 47 which is internally threaded to provide a receptacle which receives a hose coupling element 59 connected to hose 53.

The cylinder 47 is externally threaded and a cup-shaped cylinder end member 61 is threadedly connected thereto and which, in turn, is threadedly connected to a coupling element 62. The coupling element 62 has a horizontal hole 63 therethrough which receives a pin 64 that pivotally connects the actuator 44 to an extension 65 (FIG. 1) fixed to the base 11. The bore 48 on the lower side of piston 49 is vented to atmosphere by providing an opening 67 in cylinder end member 61 which communicates with an opening 68 and a passage 70 in coupling element 62 that is open to the atmosphere. The opening 68 is filled with a suitable filter material 71, such as hair or the like.

The housing 46 is also provided with a cylindrical axial extension 72 having a bore 73 therethrough which guides an actuating piston rod 74 for axial reciprocal movement. The piston rod 74 extends through bore 73 and is threadedly connected at the lower end thereof to the piston 49. A seal 75 surrounding rod 74 and engaging the walls of bore 48 prevents the escape of pressure fluid from the chamber 51 into the bore 73. The upper end of piston rod 74 has an externally threaded coupling element 76 thereon threadedly connected to an enlargement or rod end 77 which engages the right end portion of lever 25 (FIG. 1) and which is pivotally connected by a pin 78 to the right ends of a pair of links 79 and 80 which are pivotally connected at the left ends thereof to pin 41 on the opposite sides of depending portion 42 of lever 25.

Spring means, shown as an external coil spring 82 for providing the brake applying force, is disposed between the upper end of piston rod 74 and housing 46 and concentric with rod 74. Spring 82 includes an upper spring retainer 83 in engagement with the coupling element 76 and secured to the upper end of rod 74 by a dowel pin 84, and a lower spring retainer 85 in engagement with an annular flange surface or abutment 86 on the external end surface of power cylinder 47.

A bleeder port 87 formed in a radially extending integral portion 88 of the cylinder 47 communicates with the chamber 51 to permit removal of air from chamber 51 during connection of the actuator to the system 54 and when the pressure fluid is a hydraulic fluid. The bleeder port 88 is normally closed by a bleed screw 89.

When fluid pressure control valve 57 is actuated and fluid pressure in the chamber 51 of cylinder 47 increases in excess of a predetermined amount, the piston 49, rod 74, and upper spring retainer 83 move downwardly as viewed in FIG. 2 to compress or overcome the force of spring 82 so that the brake 10 will be in its released or de-energized condition, which is the condtion shown in FIG. 1.

If the fluid pressure in chamber 51 is now reduced, the force of spring 82 will move the piston 49, rod 74, and rod end 77 upwardly whereby the rod end 77 will urge the right end of lever 25 (FIG. 1) upwardly effecting radially inward movement of levers 12 and 13 due to the pivotal connection of lever 25 with lever 12 and link 27 connected to lever 13. This movement of levers 12 and 13 moves shoes 14 and 15 into frictional engagement with the drum 22. When the rod 74 moves upwardly or downwardly, the actuator 44 pivots at pin 64 because rod end 77 is connected by links 79 and 80 to depending portion 42 of the lever 25. The rod end 77 remains in engagement with lever 25 during energization and de-energization of brake 10.

The actuator 44 is provided with spring adjustment mean, indicated generally at 90, for varying the force of spring 82 and the brake-applying torque. The adjustment means 90 includes an open-ended, generally cylindrical sleeve member 91 concentric with the power cylinder 47, and an adjusting member shown as a relatively large nut 92 threadedly connected to the exterior of cylinder 47. The sleeve member 91 is disposed between the lower spring retainer 85 and an abutment or shoulder 93 on nut 92. The sleeve member 91, shown also in FIG. 3, is provided with a pair of axially extending openings or slots 94 and 95 in opposed walls thereof which permit access to the ports 52 and 87 of the power cylinder 47. In the construction shown, the radially extending portions 58 and 88 of cylinder 47 protrude through the slots 94 and 95 with the slots 94 and 95 permitting axial or vertical movement of the sleeve member 91 relative to the power cylinder 47.

The actuator 44 is shown in its brake energizing condition in FIG. 2 with the spring 82 extended substantially to its maximum length and providing substantially a minimum brake-applying force or braking torque for a given wear condition of brake linings 20 and 21.

When it is desired to adjustably increase the force of spring 82, nut 92 is manually rotated, such as by a wrench, in one direction to move sleeve member 91 upwardly which, in turn, moves the spring retainer 85 upwardly off of the abutment 86 to compress and shorten the spring 82 and thereby increase the force thereof. Under these conditions the spring 82 is compressed between the upper end of piston rod 74 and the upper end of sleeve 91.

When the spring 82 is compressed between the upper end of piston rod 74 and sleeve 91 with the lower spring retainer 85 above the abutment 86, and it is desired to decrease the force of spring 82 to reduce the braking torque, the nut 92 is, of course, rotated in the direction opposite the above-mentioned direction of rotation. This rotation of nut 92 will result in downward movement of nut 92, sleeve member 91, and spring retainer 85 to effect decompression and lengthening of spring 82 and a lower braking torque.

The spring adjustment means 90 of actuator 44 provides a simple and effective means by which the spring 82 can be adjusted to provide a considerable range of spring forces to meet varying braking torque requirements. The particular equipment utilizing the brake 10 can be made to operate at maximum efficiency since the operating spring force of the actuator 44 can be preadjusted to provide optimum braking. Also, the actuator 44 can be useful as a tool in determining the proper actuator for a particular braking application by installing actuator 44 under actual working conditions and adjusting the force of spring 82 for optimum operation. The actuator 44 can then be removed and the length or force of the spring 82 determined. In this way, a new actuator can be made with a spring having a force corresponding to the force of the adjusted spring 82.

Referring again to FIGURE 3, each of the slots 94 and 95 extends from the upper end of sleeve member 91 axially downward a predetermined distance toward the lower end of member 91. The slots 94 and 95 are open at the top of member 91 and closed at the bottom thereof. The lower ends of slots 94 and 95 are defined by wall portions 96 and 97, respectively, of member 91.

The slots 96 and 97 are formed with a predetermined axial length such that the wall portions 96 and 97 are respectively engageable with radially extending portions 88 and 58 of cylinder 47 for predeterminately limiting the upward movement of sleeve 91 by nut 92 to thereby limit the amount of adjustment of spring 82. In other words, by suitably coordinating the length of slots 94 and 95 with the maximum desired amount of compression of spring 82, the wall portions 96 and 97, as nut 92 is rotated, will eventually abut or engage the portions 88 and 58 and prevent further rotation of nut 92 so as to prevent over-compression of spring 82. Thus, with this construction, overadjustment and the danger of damage to spring 82 as a result of over-compression is obviated.

From the foregoing, it is obvious that novel actuating means meeting the objects and advantages set out hereinbefore, and others, are provided. Also, it is to be understood that the foregoing description and drawings have been given only by way of illustration and example, and that changes and alterations in the present disclosure may be made by those skilled in the art without departing from the spirit and scope of the invention as defined by the claims which follow.

The embodiments of the invention in which an exclusive property or privilege is claimed are defined as follows:

1. Operating means for a friction device comprising a housing, actuating means movable in said housing, elongated means having one end portion connected to said actuating means and an opposed end portion axially spaced from said housing for operative connection with said friction device, spring means having one end connected with said opposed end portion for normally urging said elongated means in one direction for energizing said friction device, adjustable means including a first portion threadedly coupled to said housing exteriorly thereof, and a second portion disposed between the other end of said spring means and said first portion and movable in response to rotation of said first portion to move said other end of said spring means relative to said one end thereof for varying the force of said spring means, said actuating means and said elongated means being movable in a direction opposite said one direction against the force of said spring means in response to an applied predetermined force thereon for de-energizing said friction device.

2. The operating means according to claim 1, wherein said first portion is rotatable relative to said second portion.

3. The operating means according to claim 1, comprising abutment means between said second portion and said housing to limit the movement of said second portion and said other end of said spring means.

4. The operating means according to claim 1, wherein said second portion has an opening therein, and said housing includes abutment means thereon extending into said opening for abutment with said second portion to limit said movement of said other end of said spring means.

5. The operating means according to claim 4, wherein said second portion comprises a member having a generally cylindrical wall, and opposed end walls for respective engagement with said other end of said spring means and said first portion, said opening extending through said cylindrical wall.

6. The operating means according to claim 1, wherein said actuating means comprises fluid pressure responsive means defining with said housing an expansible fluid pressure chamber, said housing having fluid pressure inlet port means communicating with said chamber for connection with a source of fluid pressure and disposed between said first portion and said other end of said spring means, said second portion having an opening therethrough in registration with said port means to permit connection thereof with said source of fluid pressure for effecting said predetermined force on said actuating means.

7. The operating means according to claim 6, wherein said port means extends into said opening for abutment with said second portion to limit said movement of said other end of said spring means.

8. Operating means for a friction device comprising a housing having an externally threaded surface, fluid pressure actuating means movable in said housing and defining therewith an expansible chamber, rod means having one end portion connected to said actuating means and an opposed end portion exteriorly of said housing and axially spaced therefrom for operative connection with said friction device, adjustable means including a first member threadedly disposed on said threaded surface, and a second member engaged with said first member for axial movement relative to said housing, and spring means connected between said opposed end portion and said second member for normally urging said rod means in one direction to effect friction device energization, said second member being axially movable in response to rotation of said first member to vary the force of said spring means, said actuating means and said rod means being movable in a direction opposite said one direction against the force of said spring means in response to fluid pressure in said chamber above a predetermined value for de-energizing said friction device.

9. Operating means for a friction device comprising power cylinder means, fluid pressure actuating means axially reciprocal in said cylinder and defining therewith an expansible chamber, elongated means having one portion connected to said actuating means and an opposed end portion axially spaced exteriorly from said cylinder for operative connection with said friction device, compressible spring means connected at one end to said opposed end portion and disposed between said opposed end portion and said power cylinder means for normally urging said elongated means in one direction to effect friction device energization, and adjustment means including a first member threadedly coupled exteriorly to said cylinder, and an axially movable, generally cylindrical second member concentric with said cylinder and disposed between said first member and the opposite end of said spring means, said second member being axially movable in response to movement of said first member to vary the compression of said spring means, said actuating means being movable in a direction opposite said one direction against the force of said spring means in response to fluid pressure in said chamber above a predetermined value for de-energizing said friction device.

10. Operating means for a friction device comprising power cylinder means having an externally threaded portion, fluid pressure actuating means reciprocal in said cylinder and defining therewith an expansible chamber, rod means having one end thereof connected to said actuating means and the opposite end thereof axially spaced exteriorly of said housing for operative connection with said friction device, compressible spring means disposed between said opposite end of said rod means and said cylinder means for urging said rod means in one direction to effect friction device energization, said cylinder means having fluid pressure inlet port means communicating with said chamber for connection with a source of pressure fluid and disposed axially between said threaded portion and one end of said spring means, said actuating means and said rod means being movable in a direction opposite said one direction against the force of said spring means in response to fluid pressure in said chamber above a predetermined value for de-energizing said friction device, and spring force adjustment including a threaded member threadedly received on said threaded portion, and an axially movable cylindrical member concentric with said cylinder and disposed between said threaded member and said one end of said spring means for moving said one end spring means relative to said housing to vary the compression of said spring means, said cylindrical member having an axially extending opening therein in registration with said port means to permit connection thereof with said source of pressure fluid.

11. Acuating means for a friction device comprising power cylinder means having an internal bore and an externally threaded portion, piston means reciprocal in said bore and defining therewith an expansible chamber, piston rod means having one end thereof connected to said piston means and the opposite end thereof axially spaced from one end of said cylinder means for operative connection with said friction device, coil spring means disposed concentrically of said rod means between said opposite end of said rod means and said one end of said cylinder means for normally urging said rod means in one direction to effect friction device energization, said cylinder means having a radially extending portion with passage means therethrough defining a pressure fluid inlet port communicating with said chamber and adapted for connection with a source of pressure fluid, said piston and rod means being movable in a direction opposite said one direction against the force of said spring means in response to fluid pressure in said chamber above a predetermined value for de-energizing said friction device, and adjustment means including a manually rotatable threaded member threadedly received on said threaded portion of said cylinder means, and an axially movable sleeve member concentric with said cylinder means and normally engaged between said threaded member and one end of said spring means, said sleeve member having an axially extending opening therein through which said radially extending portion extends to permit axial movement of said sleeve member relative to said cylinder means in response to rotation of said threaded member to vary the effective length of said spring means.

12. Actuating means for a brake having a rotatable member, support means, a friction member mounted on said support means for movement into frictional engagement with said rotatable member, and brake control means connected to said friction member for moving said friction member into frictional engagement with said rotatable member, said actuating means including power cylinder means adapted for connection at one end thereof to said support means and having an internal axial bore and an externally threaded portion, piston means reciprocal in said bore and defining therewith an expansible chamber, piston rod means having one end thereof connected to said piston means and the opposite end thereof axially spaced from the opposite end of said cylinder means for operative connection with said control means, coil spring means disposed concentrically of said rod means between said opposite end of said cylinder means and said opposite end of said rod means for normally urging said rod means and said control means in one direction to effect frictional engagement between said friction member and said rotatable member, said cylinder having a pair of radially outwardly extending portions axially between said threaded portion and said opposite end of said cylinder means, and passage means in each of said portions communicating with said chamber to define a pair of pressure fluid ports, one of said ports being adapted for connection with a source of pressure fluid, the other of said ports being adapted to receive a bleeder screw member, said piston means and said rod means being movable in a direction opposite said one direction against the force of said spring to effect disengagement between said friction member and said rotatable member, and spring force adjustment means including a threaded member threadedly received on said threaded portion, and a cylindrical member disposed concentrically with said cylinder means exteriorly thereof with one end normally engaged with said spring means and the opposite end thereof engaged with said threaded member, said cylindrical member having a pair of axially extending slots in the side walls thereof through which said radially extending portions respectively extend to permit axial movement of said cylindrical member relative to said cylinder means in response to adjustable rotation of said threaded member to vary the force of said spring means.

13. The actuating means according to claim 12 wherein said cylindrical member includes abutment means thereon engageable with one of said radially extending portions to predeterminately limit the axial movement of said cylindrical member.

14. The actuating means according to claim 12 wherein each of said slots has one end open at said one end of said cylindrical member, said cylindrical member having wall portions spaced from said one end of said cylindrical member defining the opposite ends of said slots, at least one of said wall portions being engageable with one of said radially extending portions to predeterminately limit the axial movement of said cylindrical member.

15. Acuating means for a friction device comprising power cylinder means having an internal bore and an externally threaded portion, piston means reciprocal in said bore and defining therewith an expansible chamber, piston row means having one end thereof connected to said piston means and the opposite end thereof axially spaced from one end of said cylinder means for operative connection with said friction device, coil spring means disposed concentrically of said rod means between said opposite end of said rod means and said one end of said cylinder means for normally urging said rod means in one direction to effect friction device energization, said cylinder means having a radially extending portion with passage means therethrough defining a pressure fluid inlet portion communicating with said chamber and adapted for connection with a source of pressure fluid, said piston and rod means being movable in a direction opposite said one direction against the force of said spring means in response to fluid pressure in said chamber above a predetermined value for de-energizing said friction device, and adjustment means including a manually rotatable threaded member threadedly received on said threaded portion of said cylinder means, and an axially movable sleeve member concentric with said cylinder means and normally engaged between said threaded member and one end of said spring means, said sleeve member having an axial opening therein extending from one end thereof toward the opposite end thereof with a wall portion of said sleeve member defining one end of said opening, said opening receiving said radially extending portion of said cylinder means to permit axial movement of said sleeve member relative to said cylinder means in response to rotation of said threaded member to vary the effective length of said spring means, said wall portion being engageable with said radially extending portion to predeterminately limit the axial movement of said sleeve member relative to said cylinder means.

References Cited
UNITED STATES PATENTS 2,726,641  12/1955  Hepola _____ 188—170 X

FOREIGN PATENTS 811,539  8/1951  Germany.

DUANE A. REGER, *Primary Examiner.*